(12) United States Patent
Walster et al.

(10) Patent No.: US 7,222,146 B2
(45) Date of Patent: May 22, 2007

(54) METHOD AND APPARATUS FOR FACILITATING EXCEPTION-FREE ARITHMETIC IN A COMPUTER SYSTEM

(75) Inventors: G. William Walster, Cupertino, CA (US); Eldon R. Hansen, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 933 days.

(21) Appl. No.: 10/222,612

(22) Filed: Aug. 16, 2002

(65) Prior Publication Data

US 2003/0037086 A1    Feb. 20, 2003

Related U.S. Application Data

(60) Provisional application No. 60/357,192, filed on Feb. 15, 2002, provisional application No. 60/313,358, filed on Aug. 17, 2001.

(51) Int. Cl.
*G06F 7/48* (2006.01)

(52) U.S. Cl. ...................................... 708/496

(58) Field of Classification Search ............... 708/496, 708/503–505
See application file for complete search history.

(56) References Cited

U.S. PATENT DOCUMENTS

| | | | | |
|---|---|---|---|---|
| 5,341,320 A | * | 8/1994 | Trissel et al. | ................ 708/498 |
| 6,658,444 B1 | * | 12/2003 | Walster et al. | ............... 708/504 |
| 6,842,764 B2 | * | 1/2005 | Walster | ....................... 708/207 |
| 2003/0005013 A1 | * | 1/2003 | Steele, Jr. | .................... 708/495 |
| 2003/0033335 A1 | * | 2/2003 | Walster | ....................... 708/207 |
| 2004/0215680 A1 | * | 10/2004 | Walster | ....................... 708/207 |

OTHER PUBLICATIONS

Publication: "Design, implementation and evaluation of the constraint language cc (FD)" by Pascal Van Hentenryck et al., The Journal of Logic Programming 37, 1998, pp. 139-164.
E.R. Hansen, "Global Optimization Using Interval Analysis," Marcel Dekker, Inc., New York, NY, 1992.
R.B. Kearfott, "A Fortran 90 Environment for Research and Prototyping of Enclosure Algorithms for Nonlinear Equations and Global Optimization," ACM Transactions on Mathematical Software, vol. 21, No. 1, Mar. 1995, pp. 63-78 http://interval.louisiana.edu/preprints.html.

(Continued)

*Primary Examiner*—D. H. Malzahn
(74) *Attorney, Agent, or Firm*—Park, Vaughan & Fleming LLP

(57) ABSTRACT

One embodiment of the present invention provides a system that facilitates performing exception-free arithmetic operations within a computer system. During execution of a computer program, the system receives an instruction to perform an arithmetic operation that involves manipulating floating-point values. If the arithmetic operation manipulates a floating-point value representing $\{+0\}$, the arithmetic operation is performed in a manner consistent with $\{+0\}$ representing a set containing a single value "$-0$", wherein "$-0$" is the limit of a sequence of values that approaches zero only from above. Similarly, if the arithmetic operation manipulates a floating-point value representing $\{-0\}$, the arithmetic operation is performed in a manner consistent with $\{-0\}$ representing a set containing a single value "$+0$", wherein "$+0$" is the limit of a sequence of values that approaches zero only from below.

7 Claims, 8 Drawing Sheets

OTHER PUBLICATIONS

R. B. Kearfott, Algorithm 763: Interval Arithmetic: A Fortran 90 Module for an Interval Data Type, ACM Trans. Math. Software, 22, vol. 4, 1996, pp. 385-392. http://interval.louisiana.edu/preprints.html.

R. B. Kearfott and M. Novoa III, "Algorithm 681: INTBIS, A portable interval Newton/bisection package", ACM Trans. Math Software, vol. 16, No. 2, pp. 152-147. http://www.netlib.org/toms/681.

R. B. Kearfott, M. Dawande, K.S. Du, and C. Hu, "Algorithm 737: INTLIB: A Portable Fortran 737 Interval Standard Function Library," ACM Trans. Math. Software, 20, vol. 4, Dec. 1994, pp. 447-458.

R. B. Kearfott and G.W. Walster, "On Stopping Criteria in Verified Nonlinear Systems or Optimization Algorithms," ACM Trans. Math. Software, 26, vol. 3, Sep. 2000, pp. 323-351. The publication itself says Received: Jul. 1999; revised: Mar. 2000; accepted: Mar. 2000. http://interval.louisiana.edu/preprints.html.

R.E. Moore and S.T. Jones "Safe Starting Regions for Iterative Methods", SIAM Journal on Numerical Analysis, vol. 14, No. 6 (Dec. 1977), pp. 1051-1065.

A. Neumaier, "The Enclosure of Solutions of Parameter-Dependent Systems of Euqations," Cambridge University Press, Cambridge, 1990, ISBN: 0-12-505630-3, Reliability in Computing pp. 269-286.

S.M. Rump, "Verification Methods for Dense and Sparse Systems of Equations," in Topics in Validated Computations: Proceedings of the IMACS-GAMM International Workshop on Validated Computations, University of Oldenburg, J. Herzberger, ed., Elsevier Studies in Computational Mathematics, Elsevier, 1994, pp. 63-136.

* cited by examiner

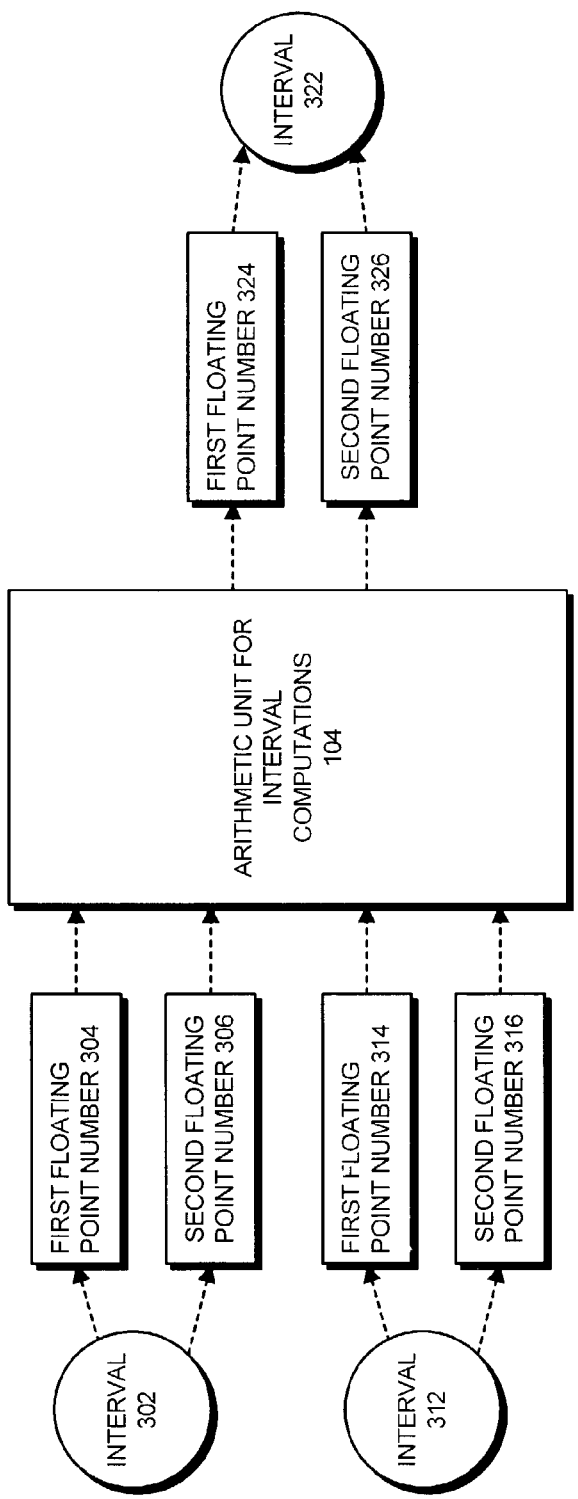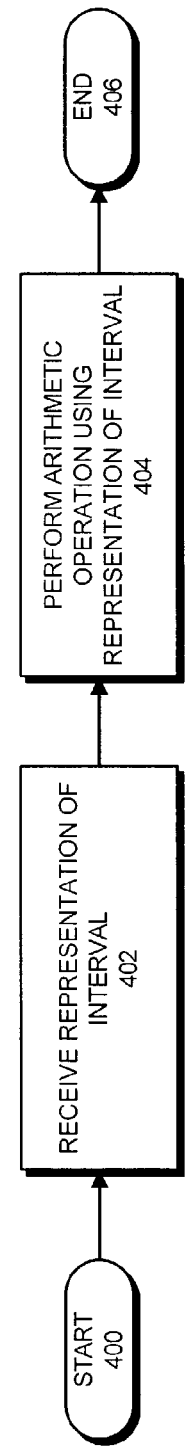

$X \equiv [\underline{x}, \bar{x}] \equiv \{x \in \Re^* | \underline{x} \leq x \leq \bar{x}\}$ $Y \equiv [\underline{y}, \bar{y}] \equiv \{y \in \Re^* | \underline{y} \leq y \leq \bar{y}\}$ (1) $X + Y = [\downarrow \underline{x} + \underline{y}, \uparrow \bar{x} + \bar{y}]$ (2) $X - Y = [\downarrow \underline{x} - \bar{y}, \uparrow \bar{x} - \underline{y}]$ (3) $X \times Y = [\min(\downarrow \underline{x} \times \underline{y}, \underline{x} \times \bar{y}, \bar{x} \times y, \bar{x} \times \bar{y}) \max(\uparrow \underline{x} \times \underline{y}, \underline{x} \times \bar{y}, \bar{x} \times y, \bar{x} \times \bar{y})]$ (4) $X / Y = [\min(\downarrow \underline{x}/\underline{y}, \underline{x}/\bar{y}, \bar{x}/\underline{y}, \bar{x}/\bar{y}) \max(\uparrow \underline{x}/\underline{y}, \underline{x}/\bar{y}, \bar{x}/\underline{y}, \bar{x}/\bar{y})]$ if $0 \notin Y$ $X / Y \subseteq \Re^*$, if $0 \in Y$

FIG. 5

| + | -∞ | -0 | real: y | +0 | +∞ |
|---|---|---|---|---|---|
| -∞ | -∞ | -∞ | -∞ | -∞ | R* |
| -0 | -∞ | -0 | y | 0 | +∞ |
| real: x | -∞ | x | x+y | x | +∞ |
| +0 | -∞ | 0 | y | +0 | +∞ |
| +∞ | R* | +∞ | +∞ | +∞ | +∞ |

FIG. 7

| - | -∞ | -0 | real: y | +0 | +∞ |
|---|---|---|---|---|---|
| -∞ | R* | -∞ | -∞ | -∞ | -∞ |
| -0 | +∞ | 0 | -y | -0 | -∞ |
| real: x | +∞ | -x | x-y | -x | -∞ |
| +0 | +∞ | +0 | -y | 0 | -∞ |
| +∞ | +∞ | +∞ | +∞ | +∞ | R* |

FIG. 8

| mult. | -∞ | real: $y<0$ | -0 | 0 | +0 | real: $y>0$ | +∞ |
|---|---|---|---|---|---|---|---|
| -∞ | +∞ | +∞ | [+0, +∞] | R* | [-∞, -0] | -∞ | -∞ |
| real: $x<0$ | +∞ | $xy$ | +0 | 0 | -0 | $xy$ | -∞ |
| -0 | [+0, +∞] | +0 | +0 | 0 | -0 | -0 | [-∞, -0] |
| 0 | R* | 0 | 0 | 0 | 0 | 0 | R* |
| +0 | [-∞, -0] | -0 | -0 | 0 | +0 | +0 | [+0, +∞] |
| real: $x>0$ | -∞ | $xy$ | -0 | 0 | +0 | $xy$ | +∞ |
| +∞ | -∞ | -∞ | [-∞, -0] | R* | [+0, +∞] | +∞ | +∞ |

FIG. 9

| div. | -∞ | real: $y<0$ | -0 | 0 | +0 | real: $y>0$ | +∞ |
|---|---|---|---|---|---|---|---|
| -∞ | [+0, +∞] | +∞ | +∞ | {-∞, +∞} | -∞ | -∞ | [-∞, -0] |
| real: $x<0$ | +0 | $x/y$ | +∞ | {-∞, +∞} | -∞ | $x/y$ | -0 |
| -0 | +0 | +0 | [+0, +∞] | R* | [-∞, -0] | -0 | -0 |
| 0 | 0 | 0 | R* | R* | R* | 0 | 0 |
| +0 | -0 | -0 | [-∞, -0] | R* | [+0, +∞] | +0 | +0 |
| real: $x>0$ | -0 | $x/y$ | -∞ | {-∞, +∞} | +∞ | $x/y$ | +0 |
| +∞ | [-∞, -0] | -∞ | -∞ | {-∞, +∞} | +∞ | +∞ | [+0, +∞] |

FIG. 10

| | |
|---|---|
| $[a, b] + [c, d] =$ | $[(a + c)_{lo}, (b + d)_{hi}]$ |
| $[a, b] - [c, d] =$ | $[(a - d)_{lo}, (b - c)_{hi}]$ |
| $[a, b] \times [c, d] =$ | $[\min\{(ac)_{lo}, (ad)_{lo}, (bc)_{lo}, (bd)_{lo}\},$ $\max\{(ac)_{hi}, (ad)_{hi}, (bc)_{hi}, (bd)_{hi}\}]$ |
| $[a, b] \div [c, d] =$ | $\begin{cases} [\min\{(a/c)_{lo}, (a/d)_{lo}, (b/c)_{lo}, (b/d)_{lo}\}, \\ \max\{(a/c)_{hi}, (a/d)_{hi}, (b/c)_{hi}, (b/d)_{hi}\}] & \text{if } d \begin{cases} \leq -0 \\ < 0 \end{cases} \begin{cases} 0 < \\ +0 \leq \end{cases} c \\ * & \text{if } 0 \in [a, b] \\ [-\infty, (a/c)_{hi}] \cup [(a/d)_{lo}, +\infty] & \text{if } \begin{cases} 0 < \\ +0 \leq \end{cases} [a, b] \\ [-\infty, (b/d)_{hi}] \cup [(b/c)_{lo}, +\infty] & \text{if } [a, b] \begin{cases} \leq -0 \\ < 0 \end{cases} \end{cases}$ |

FIG. 11

| $x$ | $\sin x, \cos x$ |
|---|---|
| $-\infty$ | $[-1, 1]$ |
| $+\infty$ | $[-1, 1]$ |

| $x$ | $\log x$ |
|---|---|
| $\left.\begin{array}{c}\leq -0 \\ < 0\end{array}\right\}$ | $\emptyset$ |
| $+0$ | $-\infty$ |
| $+\infty$ | $+\infty$ |

| $x$ | $\exp x$ |
|---|---|
| $-\infty$ | $+0$ |
| $+\infty$ | $+\infty$ |

| $x$ | $\mathrm{sign}\, x$ |
|---|---|
| $-\infty \leq x \left\{\begin{array}{c}\leq -0 \\ < 0\end{array}\right\}$ | $-1$ |
| $0$ | $\{-1, 0, 1\}$ |
| $\left\{\begin{array}{c}0 < \\ +0 \leq\end{array}\right\} x \leq +\infty$ | $1$ |

FIG. 12

METHOD AND APPARATUS FOR FACILITATING EXCEPTION-FREE ARITHMETIC IN A COMPUTER SYSTEM

RELATED APPLICATIONS

This application hereby claims priority under 35 U.S.C. §119 to U.S. Provisional Patent Application No. 60/313,358, filed on Aug. 17, 2001, entitled "Practical, Exception-Free Interval Arithmetic on the Extended Reals," by inventors G. William Walster and Eldon R. Hansen (SUN-P6429PSP), and to U.S. Provisional Patent Application No. 60/357,192 filed on Feb. 15, 2002, entitled "Symmetry in the Theory of Containment Sets," by inventors G. William Walster (SUN-P7603PSP).

BACKGROUND

1. Field of the Invention

The present invention relates to mechanisms for performing arithmetic operations within computer systems. More specifically, the present invention relates to a method and an apparatus that facilitates performing exception-free arithmetic within a computer system.

2. Related Art

Rapid advances in computing technology make it possible to perform trillions of computational operations each second. This tremendous computational speed makes it practical to perform computationally intensive tasks as diverse as predicting the weather and optimizing the design of an aircraft engine. Such computational tasks are typically performed using machine-representable floating-point numbers to approximate values of real numbers. (For example, see the Institute of Electrical and Electronics Engineers (IEEE) standard 754 for binary floating-point numbers.)

In spite of their limitations, floating-point numbers are generally used to perform most computational tasks.

One limitation is that machine-representable floating-point numbers have a fixed-size word length, which limits their accuracy. Note that a floating-point number is typically encoded using a 32, 64 or 128-bit binary number, which means that there are only $2^{32}$, $2^{64}$ or $2^{128}$ possible symbols that can be used to specify a floating-point number. Hence, most real number values can only be approximated with a corresponding floating-point number. This creates estimation errors that can be magnified through even a few computations, thereby adversely affecting the accuracy of a computation.

A related limitation is that floating-point numbers contain no information about their accuracy. Most measured data values include some amount of error that arises from the measurement process itself. This error can often be quantified as an accuracy parameter, which can subsequently be used to determine the accuracy of a computation. However, floating-point numbers are not designed to keep track of accuracy information, whether from input data measurement errors or machine rounding errors. Hence, it is not possible to determine the accuracy of a computation by merely examining the floating-point number that results from the computation.

Interval arithmetic has been developed to solve the above-described problems. Interval arithmetic represents numbers as intervals specified by a first (left) endpoint and a second (right) endpoint. For example, the interval [a, b], where a<b, is a closed, bounded subset of the real numbers, R, which includes a and b as well as all real numbers between a and b. Arithmetic operations on interval operands (interval arithmetic) are defined so that interval results always contain the entire set of possible values. The result is a mathematical system for rigorously bounding numerical errors from all sources, including measurement data errors, machine rounding errors and their interactions. (Note that the first endpoint normally contains the "infimum", which is the largest number that is less than or equal to each of a given set of real numbers. Similarly, the second endpoint normally contains the "supremum", which is the smallest number that is greater than or equal to each of the given set of real numbers. Also note that the infimum and the supremum can be represented by floating point numbers.)

Unfortunately, certain arithmetic operations involving interval endpoints and other non-interval arithmetic operations produce undefined results. For example, any real number, x≠0, divided by zero produces an undefined result, which typically generates a run-time exception during execution of a computer program. Providing code and/or circuitry to deal with these run-time exceptions can significantly complicate the design of computer systems. Moreover, the undefined results typically cause programs to fail or produce undefined results.

Hence, what is needed is a method and an apparatus that facilitates performing arithmetic operations without generating run-time exceptions.

SUMMARY

One embodiment of the present invention provides a system that facilitates performing exception-free arithmetic operations within a computer system. During execution of a computer program, the system receives an instruction to perform an arithmetic operation that involves manipulating floating-point values. If the arithmetic operation manipulates a floating-point value representing {+0}, the arithmetic operation is performed in a manner consistent with {+0} representing a set containing a single value "+0", wherein "+0" is the limit of a sequence of values that approaches zero only from above. Similarly, if the arithmetic operation manipulates a floating-point value representing {−0}, the arithmetic operation is performed in a manner consistent with {−0} representing a set containing a single value "+0", wherein "+0" is the limit of a sequence of values that approaches zero only from below.

Moreover, if the arithmetic operation manipulates a floating-point value representing {+∞}, the arithmetic operation is performed in a manner consistent with {+∞} representing a set containing a single value "+∞", wherein "+∞" is the limit of a sequence of values that approaches +∞ from below. Similarly, if the arithmetic operation manipulates a floating-point value representing {−∞}, the arithmetic operation is performed in a manner consistent with {−∞} representing a set containing a single value "+∞", wherein "+∞" is the limit of a sequence of values that approaches −∞ from above.

In a variation on this embodiment, the arithmetic operation is an interval operation that manipulates at least one interval, wherein the interval is defined by a first floating-point value that specifies a left endpoint (lower bound) of the interval and a second floating-point value that specifies a right endpoint (upper bound) of the interval.

In a variation on this embodiment, the system performs division operations without generating exceptions. If the arithmetic operation divides a floating-point value less than zero by {−0}, the result of the division is {+∞}. If the arithmetic operation divides a floating-point value less than zero by {+0}, the result of the division is {−∞}. If the arithmetic operation divides a floating-point value greater than zero by {−0}, the result of the division is {−∞}. Finally, if the arithmetic operation divides a floating-point value greater than zero by {+0}, the result of the division is {+∞}. Note that {−∞} denotes the set containing a single value "−∞", and {+∞} denotes the set containing a single value "+∞".

In a further variation, if the arithmetic operation divides {−∞} by {−∞}, −{−0} by {−0}, {+0} by {+0} or {+∞}, by {+∞} the result of the division is the interval [+0, +∞], and if the arithmetic operation divides {+∞} by {−∞}, {+0} by −{−0}, −{−0} by {+0} or {−∞} by {+∞}, the result of the division is the interval −[−∞, −0 ].

In a variation on this embodiment, the system performs multiplication operations without generating exceptions. If the arithmetic operation multiplies {−0} by {−∞} or {+0} by {+∞}, the result of the multiplication is the interval [+0, +∞]. If the arithmetic operation multiplies {+0} by {−∞} or −{−0} by {+∞}, the result of the multiplication is the interval [−∞, −0].

In a further variation, if the arithmetic operation multiplies {−0} by {−0} or {−0} by a floating-point value, x, wherein −∞<x<−0, the result of the multiplication is {+0}. If the arithmetic operation multiplies {−0} by {+0}, {+0} by {−0}, {−0} by a floating-point value, y, +0<y<+∞, or {+0} by a floating-point value, y, −∞<y<−0, the result of the multiplication is {−0}. Finally, if the arithmetic operation multiplies {+0} by {+0} or {+0} by a floating-point value, y, wherein +0<y<+∞, the result of the multiplication is {+0}.

In a variation on this embodiment, if the arithmetic operation adds {−∞} and {+∞} or {+∞} and {−∞}, the result of the addition is R*=[−∞, +∞] and if the arithmetic operation adds {−0} and {+0} or {+0} and {−0}, the result of the addition is the set {−0, +0}=[−0, +0]=0.

In a variation on this embodiment, if the arithmetic operation subtracts {−∞} and {+∞}, the result of the subtraction is R* and if the arithmetic operation subtracts {+0} from {+0} or {−0} from {−0}, the result of the subtraction is the set {−0, +0}=[−0, +0]=0.

From the above, it follows that, $$\frac{1}{0} = \frac{1}{[-0, +0]}$$
$$= \frac{1}{\{-0\}} \cup \frac{1}{\{+0\}}$$
$$= \{-\infty\} \cup \{+\infty\}$$
$$= \infty. \text{ Similarly, it follows that,}$$
$$\frac{1}{\infty} = 0.$$

BRIEF DESCRIPTION OF THE FIGURES

FIG. 3 illustrates an arithmetic unit for interval computations in accordance with an embodiment of the present invention.

FIG. 4 is a flow chart illustrating the process of performing an interval computation in accordance with an embodiment of the present invention.

FIG. 5 illustrates four different interval operations in accordance with an embodiment of the present invention.

FIG. 7 defines results of an addition operation in accordance with an embodiment of the present invention.

FIG. 8 defines results of a subtraction operation in accordance with an embodiment of the present invention.

FIG. 9 defines results of a multiplication operation in accordance with an embodiment of the present invention.

FIG. 10 defines results of a division operation in accordance with an embodiment of the present invention.

FIG. 11 defines results of several interval operations in accordance with an embodiment of the present invention.

FIG. 12 defines results of selected intrinsic functions in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Computer System

Figure 1:
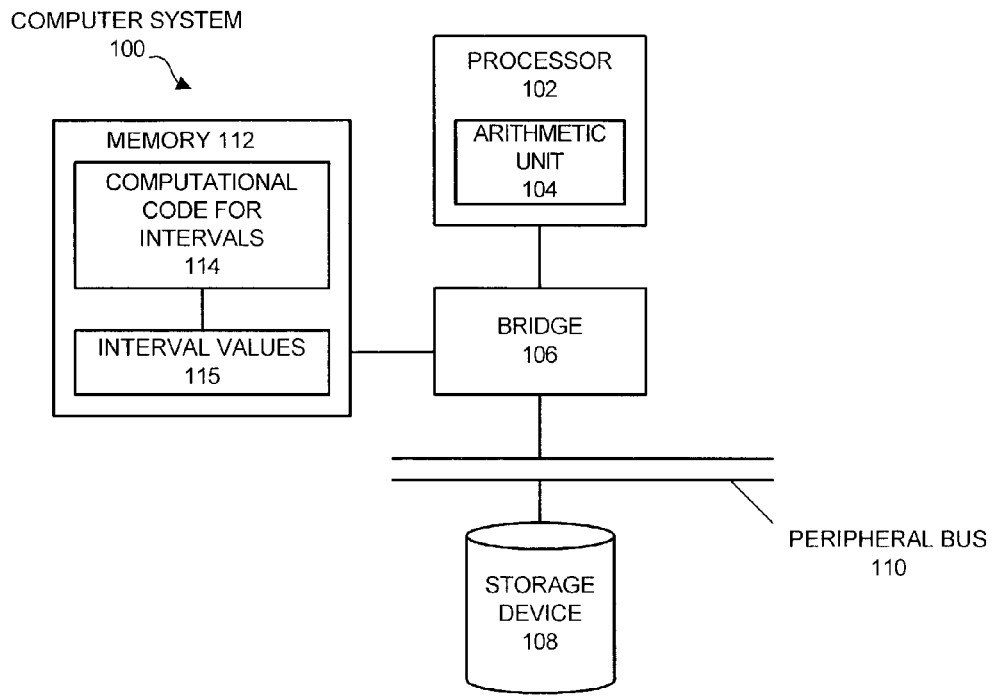
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and a to peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes an arithmetic unit 104, which is capable of performing computational operations using floating-point numbers.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102. As illustrated in FIG. 1, memory 112 contains computational code for intervals 114. Computational code 114 contains instructions for the interval operations to be performed on individual operands, or interval values 115, which are also stored within memory 112. This computational code 114 and these interval values 115 are described in more detail below with reference to FIGS. 2–5.

Note that although the present invention is described in the context of computer system 100 illustrated in FIG. 1, the present invention can generally operate on any type of computing device that can perform computations involving floating-point numbers. Hence, the present invention is not limited to the computer system 100 illustrated in FIG. 1.

Compiling and Using Interval Code

Figure 2:
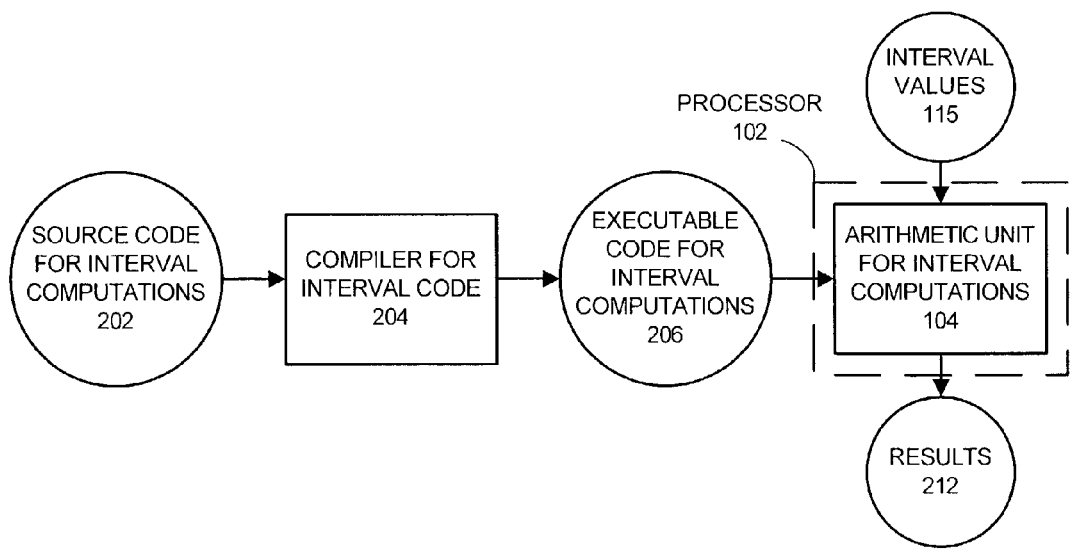
FIG. 2 illustrates the process of compiling and using code for interval computations in accordance with an embodiment of the present invention.

FIG. 2 illustrates the process of compiling and using code for interval computations in accordance with an embodiment of the present invention. The system starts with source code 202, which specifies a number of computational operations involving intervals. Source code 202 passes through compiler 204, which converts source code 202 into executable code form 206 for interval computations. Processor 102 retrieves executable code 206 and uses it to control the operation of arithmetic unit 104.

Processor 102 also retrieves interval values 115 from memory 112 and passes these interval values 115 through arithmetic unit 104 to produce results 212. Results 212 can also include interval values.

Note that the term "compilation" as used in this specification is to be construed broadly to include pre-compilation and just-in-time compilation, as well as use of an interpreter that interprets instructions at run-time. Hence, the term "compiler" as used in the specification and the claims refers to pre-compilers, just-in-time compilers and interpreters.

Arithmetic Unit for Intervals

FIG. 3 illustrates arithmetic unit 104 for interval computations in more detail accordance with an embodiment of the present invention. Details regarding the construction of such an arithmetic unit are well known in the art. For example, see U.S. Pat. Nos. 5,687,106 and 6,044,454. Arithmetic unit 104 receives intervals 302 and 312 as inputs and produces interval 322 as an output.

In the embodiment illustrated in FIG. 3, interval 302 includes a first floating-point number 304 representing a first endpoint of interval 302, and a second floating-point number 306 representing a second endpoint of interval 302. Similarly, interval 312 includes a first floating-point number 314 representing a first endpoint of interval 312, and a second floating-point number 316 representing a second endpoint of interval 312. Also, the resulting interval 322 includes a first floating-point number 324 representing a first endpoint of interval 322, and a second floating-point number 326 representing a second endpoint of interval 322.

Note that arithmetic unit 104 includes circuitry for performing the interval operations that are outlined in FIG. 5. This circuitry enables the interval operations to be performed efficiently.

However, note that the present invention can also be applied to computing devices that do not include special-purpose hardware for performing interval operations. In such computing devices, compiler 204 converts interval operations into a executable code that can be executed using standard computational hardware that is not specially designed for interval operations.

FIG. 4 is a flow chart illustrating the process of performing an interval computation in accordance with an embodiment of the present invention. The system starts by receiving a representation of an interval, such as first floating-point number 304 and second floating-point number 306 (step 402). Next, the system performs an arithmetic operation using the representation of the interval to produce a result (step 404). The possibilities for this arithmetic operation are described in more detail below with reference to FIG. 5.

Interval Operations

FIG. 5 illustrates four different interval operations in accordance with an embodiment of the present invention. These interval operations operate on the intervals X and Y. The interval X includes two endpoints, $\underline{x}$ denotes the lower bound of X, and $\overline{x}$ denotes the upper bound of X.

The interval X is a closed subset of the extended (including $-\infty$ and $+\infty$) real numbers R* (see line 1 of FIG. 5). Similarly the interval Y also has two endpoints and is a closed subset of the extended real numbers R* (see line 2 of FIG. 5).

Note that an interval is a point or degenerate interval if X=[x, x]. Also note that the left endpoint of an interior interval is always less than or equal to the right endpoint. The set of extended real numbers, R* is the set of real numbers, R, extended with the two ideal points negative infinity and positive infinity:

$$R^* = R \cup \{-\infty\} \cup \{+\infty\} = [-\infty, +\infty].$$

We also define R** by replacing the unsigned zero, {0}, from R* with the interval [−0, +0].

$$R^{**} = R^* - \{0\} \cup [-0, +0] = [-\infty, +\infty],$$
because 0=[−0, +0].

In the equations that appear in FIG. 5, the up arrows and down arrows indicate the direction of rounding in the next and subsequent operations. Directed rounding (up or down) is applied if the result of a floating-point operation is not machine-representable.

The addition operation X+Y adds the left endpoint of X to the left endpoint of Y and rounds down to the nearest floating-point number to produce a resulting left endpoint, and adds the right endpoint of X to the right endpoint of Y and rounds up to the nearest floating-point number to produce a resulting right endpoint.

Similarly, the subtraction operation X−Y subtracts the right endpoint of Y from the left endpoint of X and rounds down to produce a resulting left endpoint, and subtracts the left endpoint of Y from the right endpoint of X and rounds up to produce a resulting right endpoint.

The multiplication operation selects the minimum value of four different terms (rounded down) to produce the resulting left endpoint. These terms are: the left endpoint of X multiplied by the left endpoint of Y; the left endpoint of X multiplied by the right endpoint of Y; the right endpoint of X multiplied by the left endpoint of Y; and the right endpoint of X multiplied by the right endpoint of Y. This multiplication operation additionally selects the maximum of the same four terms (rounded up) to produce the resulting right endpoint.

Similarly, the division operation selects the minimum of four different terms (rounded down) to produce the resulting left endpoint. These terms are: the left endpoint of X divided by the left endpoint of Y; the left endpoint of X divided by the right endpoint of Y; the right endpoint of X divided by the left endpoint of Y; and the right endpoint of X divided by the right endpoint of Y. This division operation additionally selects the maximum of the same four terms (rounded up) to produce the resulting right endpoint. For the special case where the interval Y includes zero, X/Y is an exterior interval that is nevertheless contained in the interval R*.

Note that the result of any of these interval operations is the empty interval if either of the intervals, X or Y, are the empty interval. Also note, that in one embodiment of the present invention, extended interval operations never cause undefined outcomes, which are referred to as "exceptions" in the IEEE 754 standard.

The Containment-Set Concept

One embodiment of the present invention replaces the concept "range of a function" by a larger set, the containment set or c-set (pronounced "see-set"). To define the range R of $f$, consider a real function $f(x)=f(x_1, x_2, \ldots, x_n)$ of n real variables, and argument sets $X_1, \ldots, X_n$. The range of $f$ over $X=(X_1, \ldots, X_n)$ or the image of X under $f$, is the set of values produced by $f$ as $x_i$ ranges over X, for each i—that is, the set $$R=f(X)=\{f(x)|x \theta X\}, \text{ wherein } x=(x_1, x_2, \ldots, x_n).$$

The c-set is the smallest possible set that encloses R, subject to three fundamental requirements specified below. Two important consequences of these requirements are:
1. arithmetic operations on infinite values, division by zero, and invalid expressions, etc. become defined, and produce resultant c-sets that are intuitive, and provably consistent when used to compute enclosures; and
2. there is a practical algorithm to compute an enclosure of any given expression's c-set.

Re-interpreted using c-sets, real arithmetic becomes c-set arithmetic. It uses the theory of containment sets presented here (which is termed c-set theory) to compute enclosures of expression c-sets built from the four basic arithmetic operations and any other elementary functions.

"Estimating" a set S, in this disclosure, means finding a usefully small enclosure of S—as opposed to other possible tasks such as finding a usefully large subset of S.

A connection between c-sets and intervals is not necessary. As in classical interval arithmetic, to make the computation of enclosures more efficient one replaces the result-set of each elementary operation by its interval hull, that is the smallest closed interval containing the set. Arithmetic on interval hulls of c-sets is termed c-set-based interval arithmetic, or "extended interval arithmetic" because it uses the extended R* (and R**) real number systems. The fact that both intervals and c-sets are sets, eliminates computational overhead in the migration from classical to c-set-based interval arithmetic.

The meaning of $f(X)$ in the equation above is standard in pure mathematics and is used in this disclosure. Readers from the interval tradition please note that whereas in interval analysis each $X_1$ is usually an interval, upper case letters in this disclosure stand for sets, not only intervals. Mathematical readers please note that $X=(X_1, \ldots, X_n)$ is regarded interchangeably as a "vector of sets," and as the Cartesian product $X_1 \theta \ldots f X_n$.

C-set Arithmetic

The c-set arithmetic system, described here, has the property that in division by zero, or operations with infinite values, single point inputs can produce multi-point outputs. In interval computation, all inputs and outputs are sets anyway (a point value x is just syntactic sugar for the singleton set $\{x\}$), so this extension incurs no overhead.

The system goes much further. For any real function of real variables $f(x)=f(x_1, \ldots, x_n)$, the system assigns the c-set at an arbitrary point x. The c-set includes (and generally equals) the single "normal" value at x wherever $f$ exists, but also may be a multi-point set or the empty set.

The c-set's definition implies that the c-set is an enclosure $\bar{f}$ of the whole function $f$. That is, a mapping that yields a set $\bar{f}(x)$ for any (real or extended real) vector x, with the property that the normal value $f(x)$, if it exists, is in $\bar{f}(x)$. The c-set of $f$ over a set argument vector $X=(X_1, \ldots, X_n)$ is just defined as the union of the individual c-sets as x ranges over X (that is, as the $x_1$ range independently over the $X_1$). Of course, there are many ways of defining such an $\bar{f}$. In one embodiment of the present invention, the three fundamental requirements of the c-set are:

1. If $f$ is defined by an expression, and is evaluated as the composition of a number of simpler component expressions, then the composition of component expression c-sets must never underestimate (i.e. always enclose) the c-set of $f$. Failure to enclose is called a containment failure. Every programmable expression is ultimately built of a finite number of elementary functions provided by a programming language. If this requirement is satisfied, then replacing the normal library of point elementary functions with a corresponding library of c-set functions provides a guaranteed way to compute an enclosure of any programmable expression's c-set.

2. The c-set is invariant under what is termed "High School Algebra," or HSA, expression rearrangement. That is, if an expression $f$ is rearranged to g, then the functions defined by $f$ and g have the same c-set. Hence, it is valid for an optimizing compiler to sharpen enclosures and/or speed up execution by rearranging expressions following "HSA rules." An enclosure of the original function necessarily results, even when the revised evaluation sequence involves infinite values, invalid expressions, and divisions by zero that may not be present in the original expression.

3. The c-set is the minimal set with the above two properties. The c-set must include only those values of R defined by the equation at the beginning of the previous section and additional points that may be necessary to preclude HSA rearrangements from producing a containment failure.

Given c-sets that satisfy the above requirements, the resulting extended c-set system can handle functions defined by code with branches that evaluate different expressions in different regions of x-space. Such functions are often discontinuous. At a point where $f$ is continuous its c-set is always the single "normal" value of f(x). At points of discontinuity, c-sets are always multi-valued.

Allowed HSA-rearrangements include distributing or collecting terms, multiplying top and bottom of a fraction by the same sub-expression, and similar manipulations. Two valid rational expressions are called algebraically equivalent if one can be HSA-rearranged into the other. It is tempting to define algebraic equivalence in terms of a toolkit of elementary manipulations: "$f$ and g are equivalent if and only if some chain of manipulations from the toolkit converts $f$ to g." We do not take that approach, because of its complexity.

An obvious snag is that of domains: for instance, it is always true (for expressions $f$ over the reals) that log(exp ($f$)) "equals" $f$, but false that exp(log($f$)) "equals" $f$, unless it is known that the $f$ takes a positive value for all valid arguments. Another snag is that even with quite a modest library of elementary functions, determining equivalence is a logically undecidable problem. Instead, algebraic equivalence is defined only for (functions defined by) valid rational expressions $f$ and g in the same set of named variables x=

$x_1, \ldots, x_n$. A rational expression is built entirely from the four basic arithmetic operations, the given variables, and constants.

C-set properties

C-sets are especially striking for rational functions. In c-set arithmetic a rational $f$ is everywhere defined, in the sense of having a nonempty c-set at every, real or extended-real, x. For instance the c-set value of the division function x/y is the whole extended line $[-\infty, +\infty]$ if x=y=0; is the set $\{-\infty\} \cup \{+\infty\} = ]-\infty, +\infty\}$ if x≠0, y=0; is the interval $[+0, +\infty]$ if x=y=$-\infty$, x=y=$+\infty$, x=y=0, or x=y=+0; and is the interval $[-\infty, -0]$ if x=$+\infty$ and y=$-\infty$, x=$-\infty$ and y=$+\infty$, x=$-0$ and y=$+0$, or x=$+0$ and y=$-0$.

Moreover, HSA-equivalent rational functions have the same c-set. There is a simple procedure to test if two-rational functions are HSA-equivalent: Rational functions $f$ and $g$ are HSA-equivalent if $f-g=0$ when reduced to (polynomial/polynomial) form. Unfortunately, a similar simple procedure does not exist for more general functions.

The c-set of $f$ over X, written cset($f$,X) always encloses $f$(X). Both the image of a function and its c-set are mathematical rather than numerical computing constructs. Therefore, simple expressions may have complicated images and c-sets that are not ideal for computing. In contrast to general expression evaluation over arbitrary interval inputs, a well-constructed elementary function library delivers (the closest machine-representable enclosure of) the interval hull of the image [resp. c-set] of each function when evaluated over arbitrary interval input(s). To the overestimation of general $f$'s image [c-set] caused by using constituent elementary functions to evaluate $f$ additional overestimation is added if elementary functions only return a single interval hull. The single-interval-hull restriction trades c-set enclosure size (sharpness) for simplicity of representation and evaluation.

A possible objection is that the resulting loss of sharpness can be severe. For instance, because cset(1/0)=$\{-\infty, +\infty\}\{-4, +4\}$ the hull of cset(1/0) is $[-\infty, +\infty]$, so that evaluating 1/(1/x) at x=0, using extended arithmetic, is $[-\infty, +\infty]$ instead of the true c-set which is 0. The problem arises from using the interior interval hull of a set S, defined as the smallest set of the form $\{x|a \leq x \leq b\}$ containing S. That is, it is due to a defect in the chosen hull operation, not in the definition of c-sets. The exact c-set of 1/0 can be retained by permitting exterior interval hulls of form $\{x|x \leq a\} \cup \{x|x \leq b\}$ or by including the union of two semi-infinite intervals in the basic interval data structure. When the result of division by an interval containing zero is intersected with a finite interval, the result is: a single finite interval; two disjoint finite intervals; or, the empty interval. In practice, it is not difficult to anticipate this outcome and compute the result. This is done routinely in the interval version of Newton's method for finding roots of nonlinear equations. With support for exterior intervals, substantially narrower enclosures can be computed for a modest increase in complexity.

As sketched above, a compilation system that implements c-set-based interval arithmetic includes a c-set-based interval elementary function library. In addition, because of the universal nature of c-sets, anyone may introduce a new elementary function (a Bessel or other special function, for instance), by simply coding any algorithm (based on the function's mathematical definition) to enclose its c-set. The resulting algorithm is guaranteed to interoperate with existing c-set-based interval libraries and cannot produce a containment failure. In this sense c-set theory offers a "safe and open system" for developers.

Exception-Free Arithmetic Operations

Figure 6:
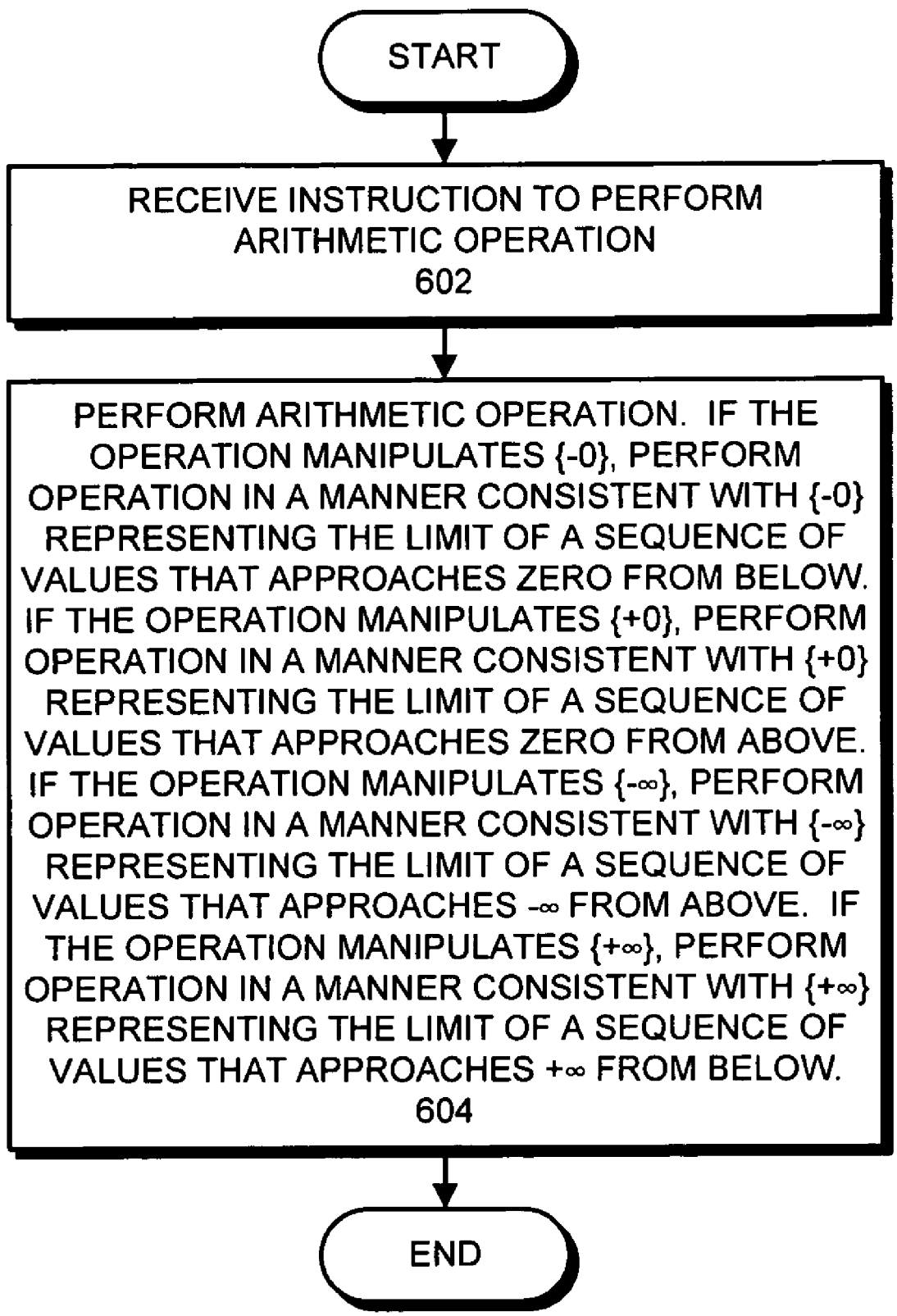
FIG. 6 presents a flow chart illustrating the process of performing an arithmetic operation in accordance with an embodiment of the present invention.

FIG. 6 presents a flow chart illustrating the process of performing an arithmetic operation in accordance with an embodiment of the present invention. The system starts by receiving an instruction to perform an arithmetic operation (step 602). Next, the system performs the arithmetic operation. During this process, if the arithmetic operation manipulates a floating-point value representing $\{+0\}$, the arithmetic operation is performed in a manner consistent with $\{+0\}$ representing a set containing a single value "$-0$", wherein "$-0$" is the limit of a sequence of values that approaches zero only from above. Similarly, if the arithmetic operation manipulates a floating-point value representing $\{-0\}$, the arithmetic operation is performed in a manner consistent with $\{-0\}$ representing a set containing a single value "$+0$", wherein "$+0$" is the limit of a sequence of values that approaches zero only from below.

Moreover, if the arithmetic operation manipulates a floating-point value representing $\{+\infty\}$, the arithmetic operation is performed in a manner consistent with $\{+\infty\}$ representing a set containing a single value "$+\infty$", wherein "$+\infty$" is the limit of a sequence of values that approaches $+\infty$ from below. Similarly, if the arithmetic operation manipulates a floating-point value representing $\{-\infty\}$, the arithmetic operation is performed in a manner consistent with $\{-\infty\}$ representing a set containing a single value "$+\infty$", wherein "$+\infty$" is the limit of a sequence of values that approaches $-\infty$ from above. (step 604).

FIG. 7 defines results of an addition operation in accordance with an embodiment of the present invention. As one would expect, adding $\{-\infty\}$ to any number generally results in $\{-\infty\}$, and adding $\{+\infty\}$ to any number generally results in $\{+\infty\}$. The exceptions occur when the arithmetic operation adds $\{-\infty\}$ and $\{+\infty\}$ or $\{+\infty\}$ and $\{-\infty\}$. In these cases, the result of the addition is R*. Moreover, if the arithmetic operation adds $\{-0\}$ and $\{+0\}$, the result is the set $\{-0, +0\}=[-0, +0]=0$. Furthermore, as one would expect, adding $\{-0\}$ and $\{-0\}$ results in $\{-0\}$, and adding $\{+0\}$ and $\{+0\}$ results in $\{+0\}$.

FIG. 8 defines results of a subtraction operation in accordance with an embodiment of the present invention. As one would expect, adding $\{+\infty\}$ to any number or subtracting $\{-\infty\}$ from any number generally results in $\{+\infty\}$, and adding $\{-\infty\}$ to any number or subtracting $\{+\infty\}$ from any number generally results in $\{-\infty\}$. The exceptions occur when the arithmetic operation subtracts $\{+0\}$ from $\{+0\}$ or $\{-0\}$ from $\{-0\}$. In these cases, the result of the subtraction is the set $\{-0, +0\}=[-0, +0]=0$. Moreover, if the arithmetic operation subtracts $\{-0\}$ from $\{-0\}$ or $\{+0\}$ from $\{-0\}$, the result is the set $\{-0, +0\}=[-0, +0]=0$. Furthermore, subtracting $\{-0\}$ from $\{+0\}$ results in $\{+0\}$, and subtracting $\{+0\}$ from $\{-0\}$ results in $\{-0\}$.

FIG. 9 defines results of a multiplication operation in accordance with an embodiment of the present invention. If the arithmetic operation multiplies $\{-0\}$ by $\{-\infty\}$ or $\{+0\}$ by $\{+\infty\}$, the result of the multiplication is the interval $[+0, +\infty]$. If the arithmetic operation multiplies $\{+0\}$ by $\{-\infty\}$ or $\{-0\}$ by $\{+\infty\}$, the result of the multiplication is the interval $[-\infty, -0]$.

Furthermore, if the arithmetic operation multiplies $\{-0\}$ by $\{-0\}$ or $\{-0\}$ by a floating-point value, x, wherein $-\infty<x<0$, the result of the multiplication is $\{+0\}$. If the arithmetic operation multiplies $\{-0\}$ by $\{+0\}$, $\{+0\}$ by $\{-0\}$, or $\{-0\}$ by a floating-point value, y, wherein $0<y<+\infty$, the result of the multiplication is $\{-0\}$. Finally, if the arithmetic operation multiplies {+0} by {+0} or {+0} by a floating-point value, y, wherein 0<y<+∞, the result of the multiplication is {+0}.

FIG. 10 defines results of a division operation in accordance with an embodiment of the present invention. If the arithmetic operation divides a floating-point value less than zero by {−0}, the result of the division is }+∞}. If the arithmetic operation divides a floating-point value less than zero by {+0}, the result of the division is {−∞}. If the arithmetic operation divides a floating-point value greater than zero by {−0}, the result of the division is {−∞}. Moreover, if the arithmetic operation divides a floating-point value greater than zero by {+0} the result of the division is {+∞}.

Furthermore, if the arithmetic operation divides {−∞} by {−∞}, {−0} by {−0}, {+0} by {+0} or {+∞} by {+∞}, the result of the division is the interval [+0, +∞], and if the arithmetic operation divides {+∞} by {−∞}, {+0} by {−0}, {−0} by {+0} or {−∞} by {+∞}, the result of the division is the interval [−∞, −0].

FIG. 11 defines results of several interval operations in accordance with an embodiment of the present invention. Note that the interval division operation achieves tighter results than a conventional interval division operation because in some cases the result of this division operation in an exterior interval instead of R*. Note that the subscript "lo" that appears in FIG. 11 represents a lower bound if the result is an interval. Similarly, the subscript "hi" represents an upper bound if the result is an interval.

FIG. 12 defines results of selected intrinsic functions in accordance with an embodiment of the present invention. More specifically, FIG. 12 defines results of the functions sin(x), cos(x), log(x), exp(x) and sign(x).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus that facilitates performing exception-free arithmetic operations within a computer system, comprising:
   an arithmetic unit that is configured to receive an instruction to perform an arithmetic operation during execution of a program on the computer system, wherein the arithmetic operation manipulates floating-point values, wherein the arithmetic operation is an interval operation that manipulates at least one interval, and wherein the interval is defined by a first floating-point value that specifies a left endpoint (lower bound) of the interval and a second floating-point value that specifies a right endpoint (upper bound) of the interval; and
   wherein in response to the instruction, the arithmetic unit is configured to perform the arithmetic operation;
   wherein if the arithmetic operation manipulates a floating-point value representing {+0}, the arithmetic operation is performed in a manner consistent with {+0} representing the limit of a sequence of values that approaches zero only from above; and
   wherein if the arithmetic operation manipulates a floating-point value representing {−0}, the arithmetic operation is performed in a manner consistent with {−0} representing the limit of a sequence of values that approaches zero only from below.

2. The apparatus of claim 1,
   wherein if the arithmetic operation divides a floating-point value less than zero by {−0}, the result of the division is {+4};
   wherein if the arithmetic operation divides a floating-point value less than zero by {+0}, the result of the division is {−4};
   wherein if the arithmetic operation divides a floating-point value greater than zero by {−0}, the result of the division is {−4}; and
   wherein if the arithmetic operation divides a floating-point value greater than zero by {+0}, the result of the division is {+4}.

3. The apparatus of claim 2,
   wherein if the arithmetic operation divides {−4} by {−4}, {−0} by {−0}, {+0} by {+0} or {+4} by {+4}, the result of the division is the interval [+0, +4]; and
   wherein if the arithmetic operation divides {−4} by {−4}, {+0} by {−0}, {−0} by {+0} or {−4} by {+4}, the result of the division is the interval [−4, −0].

4. The apparatus of claim 1,
   wherein if the arithmetic operation multiplies {−0} by {−4} or {+0} by {+4}, the result of the multiplication is the interval [+0, +4]; and
   wherein if the arithmetic operation multiplies {+0} by {−4} or {−0} by {+4}, the result of the multiplication is the interval [−4, −0].

5. The apparatus of claim 4,
   wherein if the arithmetic operation multiplies {−0} by {−0} or {−0} by a floating-point value, x, wherein −4<x<−0, the result of the multiplication is {+0};
   wherein if the arithmetic operation multiplies {−0} by {+0}, {+0} by {−0}, {+0} by a floating-point value, y, +0<y<+4, or {+0} by a floating-point value, y, −4<y<−0, the result of the multiplication is {−0}; and
   wherein if the arithmetic operation multiplies {+0} by {+0} or {+0} by a floating-point value, y, wherein +0<y<+4, the result of the multiplication is {+0}.

6. The apparatus of claim 1,
   wherein if the arithmetic operation adds {−4} and {+4} or {+4} and {−4}, the result of the addition is R*; and
   wherein if the arithmetic operation adds {−0} and {+0} or {+0} and {−0}, the result of the addition is the set {−0, +0}=[−0, +0]=0.

7. The apparatus of claim 1,
   wherein if the arithmetic operation subtracts {−4} and {+4}, the result of the subtraction is R*; and
   wherein if the arithmetic operation subtracts {+0} from {+0} or {−0} from {+0}, the result of the subtraction is the set {−0, +0}=[−0, +0]=0.

* * * * *

UNITED STATES PATENT AND TRADEMARK OFFICE
CERTIFICATE OF CORRECTION

PATENT NO. : 7,222,146 B2  Page 1 of 1
APPLICATION NO. : 10/222612
DATED : May 22, 2007
INVENTOR(S) : G. William Walster It is certified that error appears in the above-identified patent and that said Letters Patent is hereby corrected as shown below:

In claim 3 (at column 12, line 25), please delete the phrase, "{-4} by {-4}" and replace with the phrase --{+4} by {-4}--.

In claim 5 (at column 12, line 41), please delete the phrase, "{-0}, {+0}" and replace with the phrase --{-0}, {-0}--.

Signed and Sealed this

Tenth Day of July, 2007

JON W. DUDAS
*Director of the United States Patent and Trademark Office*